Dec. 29, 1931. J. J. MILLER ET AL 1,838,780
AUTOMATIC MATERIAL FEEDING MACHINE
Filed June 19, 1929

INVENTOR
Joseph J. Miller
George A. Weigt

Patented Dec. 29, 1931

1,838,780

UNITED STATES PATENT OFFICE

JOSEPH J. MILLER AND GEORGE A. WEIGT, OF FRESNO, CALIFORNIA, ASSIGNORS OF ONE-THIRD TO EARL WEIMAR, OF PINEDALE, CALIFORNIA

AUTOMATIC MATERIAL FEEDING MACHINE

Application filed June 19, 1929. Serial No. 372,167.

Our invention relates to a machine that has for its purpose the automatic feeding of short lumber, or other material, into the feed rolls of a resaw machine and in so doing constitutes a very decided improvement over the method now in use by numerous lumber companies in the United States. The present method of feeding short lumber into a vertical resaw machine, for which our invention is especially adapted, is that of hand feeding, the use of two operators being required. Our invention will dispense with one of these operators and in addition, due to the speed and accuracy of the machine, will increase production by 15%.

The primary object of our invention is to provide a simple, quick, cheap, practical method of feeding short lumber, or other material, into a resaw machine which to date has not been successfully accomplished by any other machine for this purpose either for its practicability as to method of operation or cost thereof although much intensive effort and money has been expended to solve the problem.

Other objects accomplished, and their bearing upon the primary objects of this invention are self-apparent upon the perusal of the following:

By means provided, short lumber or other material is brought into contact with a straight-edge which supports and positions the lumber, or other material, so that the feed-fingers, operating on a rack and crosshead by means of power transmitted to them through the action of air or steam passing through the valve into the cylinder and in turn transmitting power by means of the operation of the piston rod to said crosshead and racks, come in contact with the lumber, or other material, and feeds it steadily into the feed rolls of the resaw machine.

Figure 2:
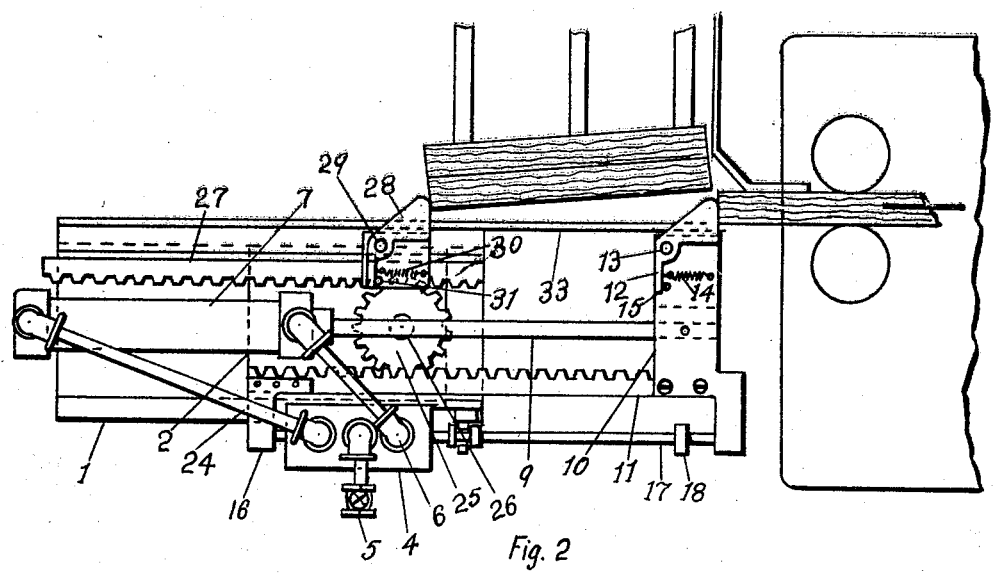
Figures 1, 3:
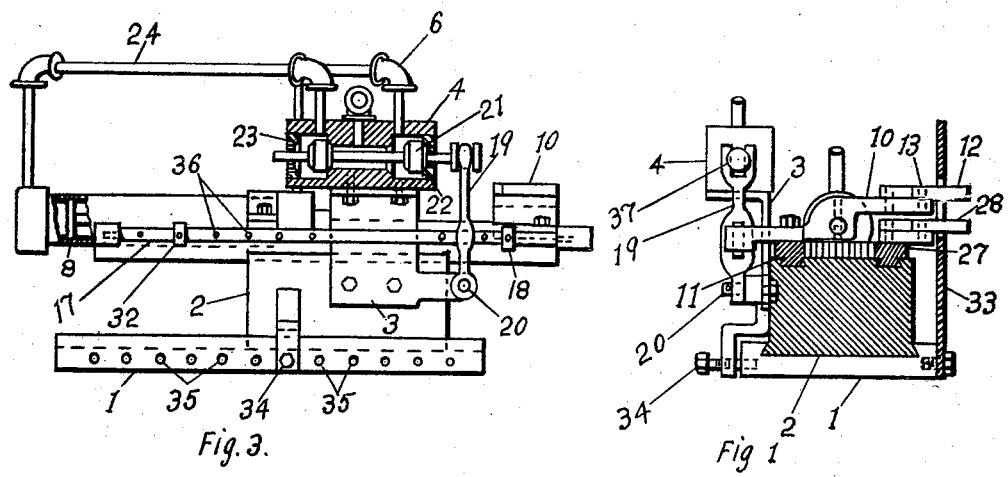
Figure 4:
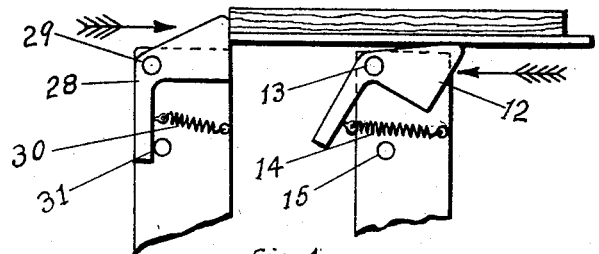

We accomplish these and other objects self-apparent by means of such structure and relative parts as are fully disclosed in the drawings which form a part of this specification, in which similar characters of reference designate similar parts throughout said specification and drawings and in which Figure 1 shows the end elevation, the sectional view of racks and adjusting block and section of straight-edge showing feed-fingers projecting through slot; Figure 2 represents a plan view of the entire machine showing operative position of feed-fingers with lumber in position and ready to be fed into the feed rolls; Figure 3 shows the side elevation, sectional view of valve, and sectional view through part of cylinder showing the piston; Figure 4 represents position of feed-fingers when same are operating in opposite directions and showing piece of lumber in the act of being fed into the feed rolls which are shown in Figure 2, the one feed-finger being shown in the act of feeding a piece of lumber while the other feed-finger is automatically doubled back out of the way as it returns to position to feed the lumber that follows, thereby keeping moving a steady flow of material.

Sliding in a groove in a stationary base 1 is an adjustable block 2 to which is fastened a bracket 3 supporting the valve cage 4. Through the medium of a valve 5 air or steam is admitted to the valve cage 4 which in turn passes through a pipe 6 into the end of a cylinder 7 furnishing power to the piston head 8 to which is attached a piston rod 9 to which in turn is fastened the crosshead 10. A rack 11 sliding in an adjustable block 2 is fastened to the crosshead 10 to which is attached a feed-finger 12 fulcrumed on a pin 13 same being in turn also fastened to the crosshead 10. Suitable means, such as a spring 14 keeps the feed-finger 12 in an outward, or operative position, by holding it against a stop pin 15, as illustrated in Figure 2. To one end of the rack 11 is mounted a bracket 16 to which is attached a reversing rod 17 which extends to and is supported by the crosshead 10; there being mounted on the reversing rod 17 a set collar 18. The lever 19 is fulcrumed on a pin 20 which in turn is fastened to the bracket 3, the upper end of the lever 19 resting in a spool 37 at the end of valve 21. If desired, the valve 21 can be of the type described in the co-pending application of Joseph J. Miller, Serial Number 371,087, filed June 15, 1929. As the set collar 18 comes in contact with the lever 19, it causes the valve 21 to move from its seat 22 to its seat 23 thereby allowing the air or steam to pass through the pipe 24 into the piston head 8 thereby causing the piston head 8 to reverse its position, the rack 11 in turn meshing with a pinion 25 which revolves on a pin 26, the pinion 25 in turn meshing with and transmitting motion to a rack 27 to which is fastened a feed-finger 28 which in turn fulcrums on a pin 29; the feed-finger 28 being held in an operative position by a spring 30 and a stop pin 31. When the set collar 32, which is mounted on the reversing rod 17, comes in contact with the lever 19 the valve 21 is caused to move from its seat 23 to its seat 22 thereby reversing the direction of motion, as before described.

The short lumber, or other material, is brought to position against the face of the straight-edge 33, suitable means being provided for this purpose, and is carried by means of a feed-finger 28 into the feed rolls of the resaw machine, a portion of a vertical resaw machine being illustrated in Figure 5 on the drawing and before referred to as being no part of our invention as claimed in this specification. As feed-finger 28 carries the piece of lumber, or other material, forward into the feed rolls, feed-finger 12 pivoting on a pin 13 is automatically pressed out of the way, as illustrated in Figure 4, not only to permit of the passing of the piece of material but also to allow feed-finger 28 to come into the position formerly occupied by the feed-finger 28 while a spring 14 causes feed-finger 12 to return to its operative position, and the action continues as before.

The straight-edge 33 is a plate against which the lumber, or other material, comes to position in readiness to be fed into the feed rolls of the resaw machine and feed-fingers 12 and 28 operate through a slot cut into the face of the straight-edge, or plate 33, as illustrated in Figure 1. It will be here noted that feed-fingers 12 and 28 may be operated independently of each other by removing the pinion 25 and by driving racks 11 and 27 independently.

Adjusting the length of stroke to permit the feeding of long or short material is accomplished by positioning set collars 18 and 32 in any of the series of holes 36 provided for in the reversing rod 17; likewise, lock screw 34 when positioned in one of a series of holes 35 provided for in the stationary base 1, permits the adjustable block 2 to be locked in the desired position.

While this specification sets forth in detail the present and preferred construction of the device, still in practice such deviations from such detail may be resorted to as do not form a departure from the spirit of the invention as defined by the appended claims.

Having thus described our invention, what we claim as new and useful and desire to protect by Letters Patent, is—

1. Feeding mechanism comprising a pair of movable feed members, said members being interconnected to move in opposite directions relative to each other at all times, means for imparting reciprocatory movement to one of said members, and said last mentioned member serving to drive the other of said members through the interconnecting means, whereby said members alternately execute a feed motion.

2. Feeding mechanism comprising a pair of longitudinally movable racks, a gear meshing with both of said racks whereby said racks are constrained to move in opposite directions, a feed finger mounted on each of said racks and means for imparting reciprocatory motion to said racks, whereby each of said feed fingers executes a feed stroke alternating with the feed stroke of the other finger.

3. Feeding mechanism comprising a pair of longitudinally movable racks, a gear meshing with both of said racks whereby said racks are constrained to move in opposite directions, a feed finger mounted on each of said racks and motive means for imparting reciprocatory motion to one of said racks, said motive means comprising a fluid operated piston, a valve for controlling said motive means, and means actuated by movement of one of said racks for controlling said valve.

4. In a feeding mechanism, a pair of longitudinally movable racks, a work engaging feed member carried by each of said racks, a gear meshing with both of said racks whereby said racks are constrained to move in opposite directions, motive means for imparting reciprocatory movement to one of said racks, control means for controlling said motive means actuated by one of said racks, and means for adjusting said control means to vary the extent of the reciprocating movement.

5. In a feeding mechanism, a pair of longitudinally movable racks, a gear meshing with both of said racks whereby said racks are constrained to move in opposite directions, means for imparting reciprocatory movement to said racks, a feed finger mounted on each of said racks, said feed fingers being arranged to move in adjacent parallel paths thereby performing alternately substantially the same feeding operation.

6. In a feeding mechanism, a pair of longitudinally movable racks, a gear meshing with both of said racks whereby said racks are constrained to move in opposite directions, means for imparting reciprocatory movement to said racks, a feed finger mounted on each of said racks, said feed fingers being arranged to move in adjacent parallel paths thereby performing alternately substantially the same operation, and each of said feed fingers adapted to be moved to an inoperative position during movement in one direction of its associated rack.

7. In a feeding mechanism, a pair of longitudinally movable racks, a gear meshing with both of said racks whereby said racks are constrained to move in opposite directions, means for imparting reciprocatory movement to said racks, a feed finger mounted on each of said racks, said feed fingers being arranged to move in adjacent parallel paths thereby performing alternately substantially the same operation, and each of said feed fingers adapted to be made operative during movement in one direction of its associated rack and adapted to be made inoperative during movement in the opposite direction.

8. In a feeding mechanism, a pair of longitudinally movable racks, a work engaging feed member carried by each of said racks, means interconnecting said racks whereby said racks are constrained to move in opposite directions, motive means for imparting reciprocatory movement to one of said racks said motive means including a double acting fluid operated piston, a valve for controlling the operation of said piston, means mounted on one of said racks for actuating valve and means for adjusting the period of operation of said valve.

9. In a feeding mechanism, a pair of longitudinally movable racks, a feed finger carried by each of said racks, a pinion meshing with both of said racks whereby said racks are constrained to move in opposite directions, means for imparting a reciprocatory movement to one of said racks whereby each of said fingers executes a reciprocating feed stroke and each of said fingers adapted to be depressed into an inoperative position during the backstroke of its motion.

10. A feeding mechanism adapted to feed lumber and the like comprising a pair of longitudinally movable racks, a work engaging feed finger carried by each of said racks, a block in which said racks are slidably mounted, a pinion meshing with both of said racks whereby said racks are constrained to move in opposite directions, means for regulating the movement of said racks and means for adjusting said block to compensate for regulation of the movement of said racks.

11. In a feeding mechanism adapted to feed lumber and the like, a pair of longitunally movable racks, said racks being mounted substantially parallel to one another in a substantially horizontal plane, a pinion meshing with each of said racks whereby said racks are constrained to move in opposite directions, a feed finger mounted on each of said racks, said feed fingers adapted to move in parallel paths in a substantially vertical plane, a vertically disposed plate having a slot therein and said feed fingers extending through said slot whereby said feed fingers are adapted to engage the material to be fed.

JOSEPH J. MILLER.
GEORGE A. WEIGT.